No. 701,183. Patented May 27, 1902.
G. H. ELLIS.
METHOD OF PREPARING FLAX FIBER FOR SPINNING.
(Application filed July 23, 1900.)
(No Model.) 3 Sheets—Sheet 1.
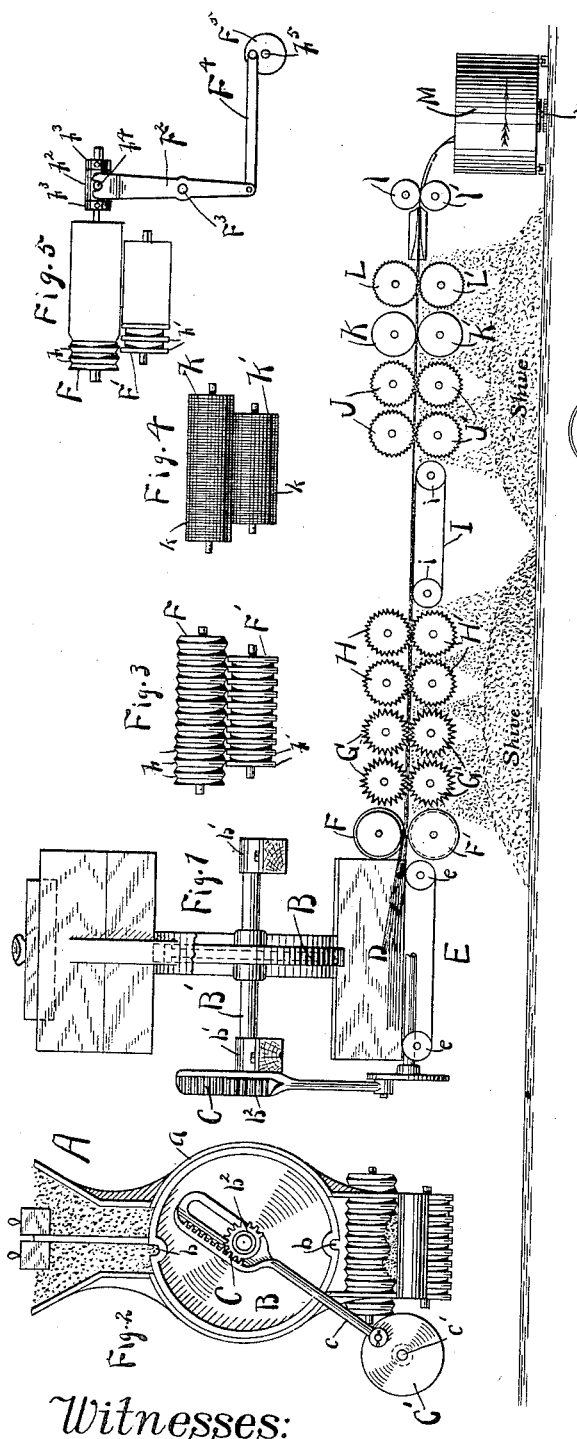
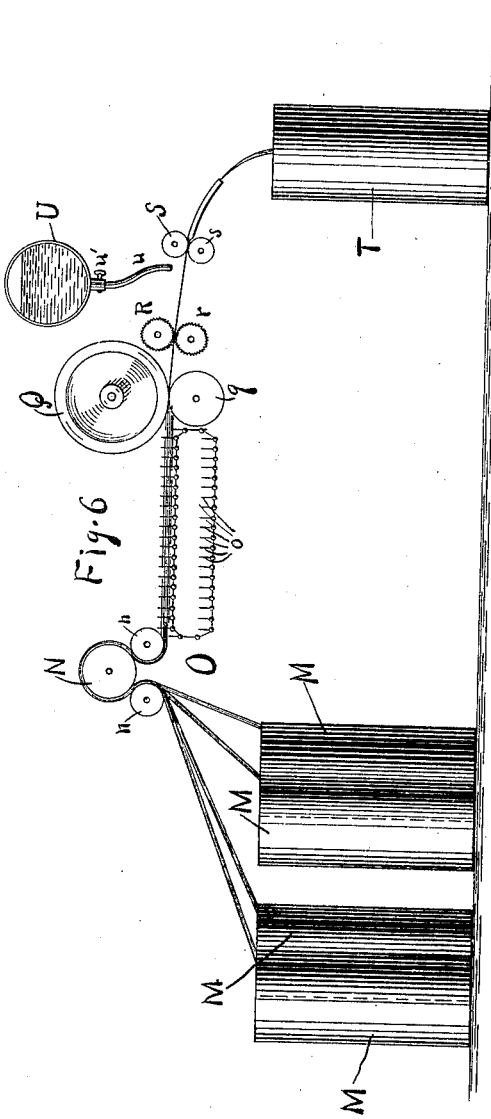
Witnesses:
Chas. M. Chambers.
Samuel W. Banning.
Inventor:
George H. Ellis,
By Banning & Banning.
Attorneys.

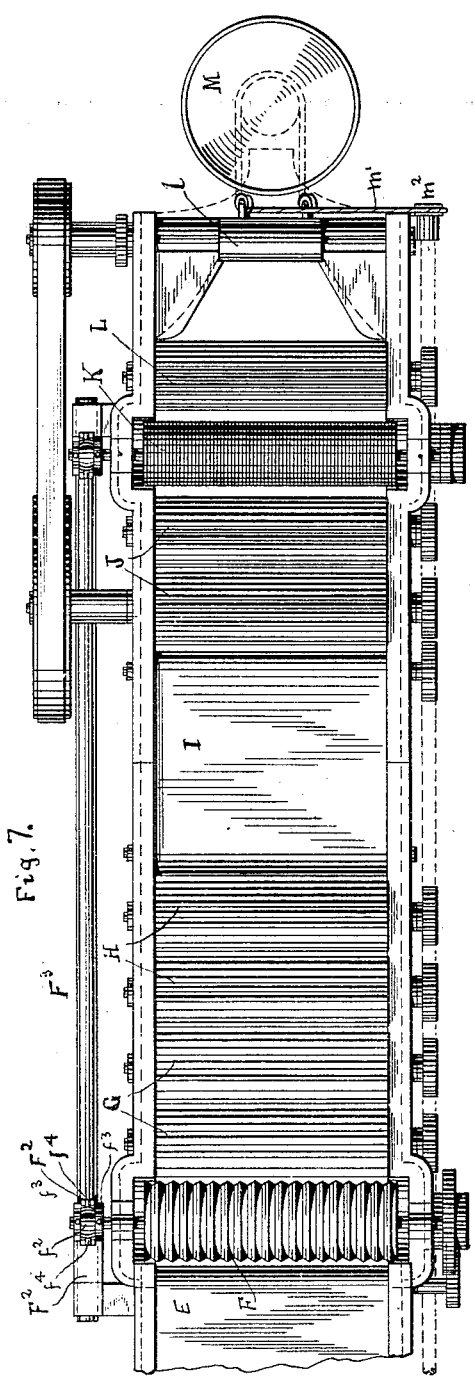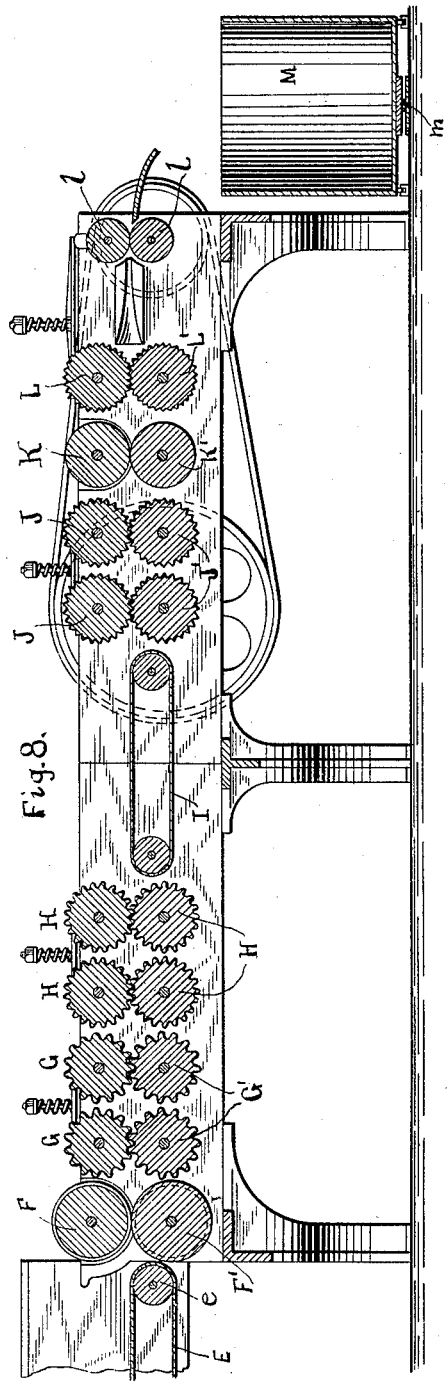

No. 701,183. Patented May 27, 1902.
G. H. ELLIS.
METHOD OF PREPARING FLAX FIBER FOR SPINNING.
(Application filed July 23, 1900.)
(No Model.) 3 Sheets—Sheet 3.
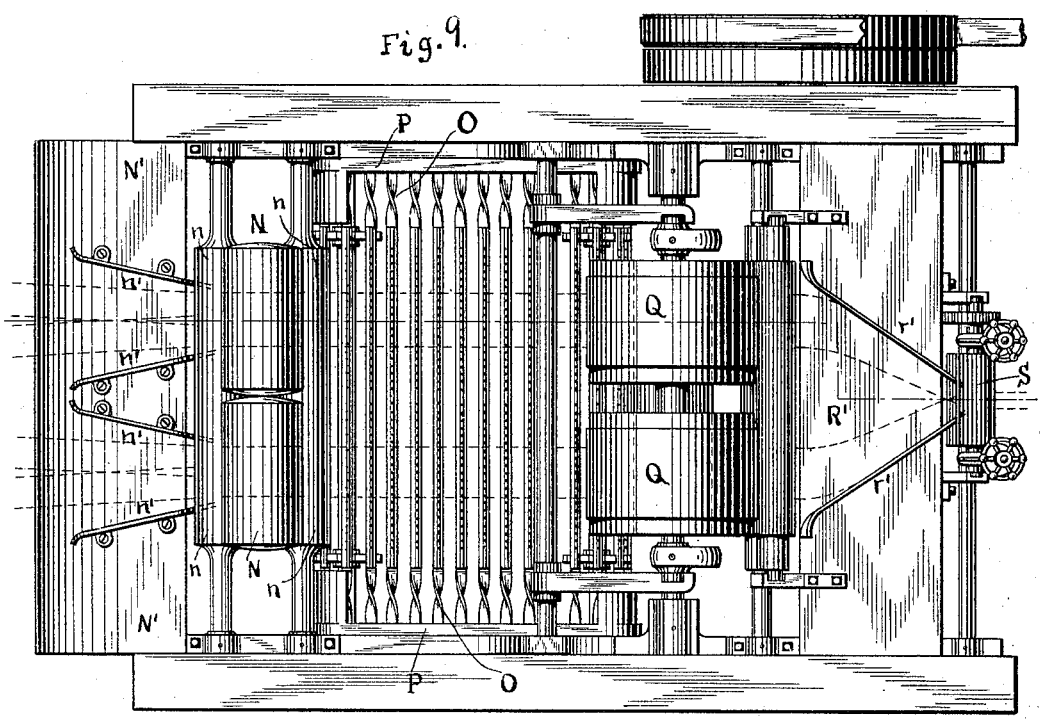
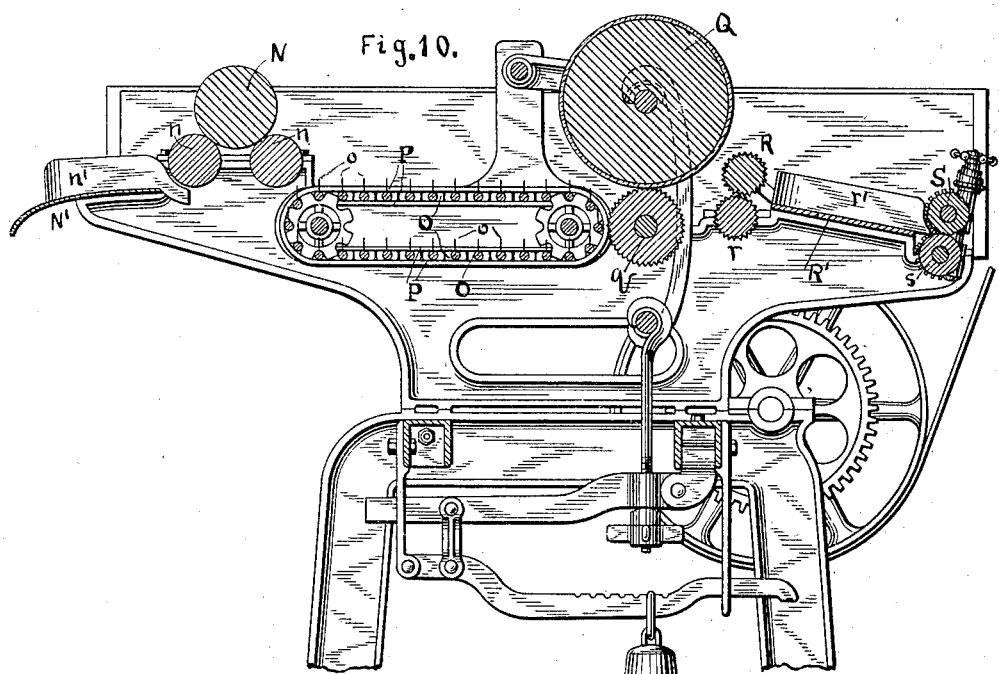

UNITED STATES PATENT OFFICE.

GEORGE H. ELLIS, OF CHICAGO, ILLINOIS, ASSIGNOR TO DEERING HARVESTER COMPANY, OF CHICAGO, ILLINOIS.

METHOD OF PREPARING FLAX FIBER FOR SPINNING.

SPECIFICATION forming part of Letters Patent No. 701,183, dated May 27, 1902.

Application filed July 23, 1900. Serial No. 24,542. (No specimens.)

*To all whom it may concern:*

Be it known that I, GEORGE H. ELLIS, a citizen of the United States, residing at Chicago, Cook county, Illinois, have invented a certain new and useful Method of Preparing Flax Fiber for Spinning, of which the following is a specification.

The object of my invention is to devise a process by which I can prepare flax fiber for spinning, and particularly unretted or unrotted flax while in a raw, natural, and unprepared condition, so as to separate the woody substance from the fiber, and then by subjecting the fiber to a certain mode of treatment prepare it for the spinning-jennies, so that it can be spun into twine or cord, and thus in the case of unretted or unrotted flax avoid and save all the loss of time, labor, and material incident to the ordinary method of treatment, which involves the retting or rotting of the flax through exposure to the weather, requiring weeks of time, constant attention, turning, and manipulation; and my invention consists in the process or method of treatment hereinafter described and claimed.

In the drawings, Figure 1 is a side elevation, partly diagrammatic, of the mechanism which I prefer to use in my process or method of preparing flax fiber for spinning. Fig. 2 is an end elevation, partly in section, of the same. Fig. 3 is a side elevation of the first set of rollers employed in my process. Fig. 4 is a side elevation of another set of rollers. Fig. 5 is a side elevation of the rollers shown in Fig. 3 with the means for imparting an endwise reciprocating motion to the upper roller. Fig. 6 is a diagrammatic view of the drawing frame or mechanism employed at one stage of my process; Fig. 7, a plan view of the fiber-separating and sliver-forming machine; Fig. 8, a sectional elevation of the fiber-separating and sliver-forming machine; Fig. 9, a plan view of the sliver drawing and treating machine, and Fig. 10 a sectional elevation of the sliver drawing and treating machine.

In preparing flax fiber for spinning I take the flax-straw after it has been cut and dried or cured either by natural or artificial means and after the seed has been removed from it and feed the straw into a hopper or trough A. This trough is of sufficient longitudinal dimensions to accommodate the length of the straw, so that it will lie in the same in a longitudinal position. This hopper is open at the bottom or has a longitudinal opening at the bottom, so that the straw can be fed through the same. In order to feed the straw through in the desired way, I arrange under the trough or hopper and transversely to it a reciprocating or rocking wheel or disk B. This disk is provided, as I prefer to make it, with two oppositely-disposed notches $b$, so that as it is rocked or reciprocated back and forth in partial revolutions the notches will catch and pull out from the hopper or trough a wisp of straw and carry the same down beneath it in its rocked or partial revolutions. The disk is surrounded or inclosed in a case $a$, extending down from the bottom of the trough or hopper, as will be understood from an inspection of the drawings. The disk or wheel B is mounted upon a shaft $B'$, by which it is rocked or oscillated. This shaft is held in suitable boxes or journals $b'$, supported on the framework of the machine in the usual way, as will be understood from an inspection of Fig. 1. In order to give the rocking or oscillating motion to the notched disk through means of its shaft, I arrange or mount on the end of the shaft a pinion $b^2$, the teeth of which engage with the teeth of a rack C on a pitman $c$, pivoted to a crank-wheel or eccentric $C'$, mounted on a shaft $c'$, to which rotary motion is imparted in any desired way. As the shaft $c'$ is rotated the pitman $c$ is reciprocated, and through means of its rack C the pinion $b^2$ is rotated back and forth, so as to impart rotation back and forth to the shaft $B'$ and the notched disk, thus causing the notches in the disk as they pass under the longitudinal slot or opening in the hopper or trough to catch and pull out wisps of the flax-straw feeding down in the same by gravity and carry such wisps around and drop them beneath the disk.

As the wisps of flax-straw are dropped by the disk they fall on a traveling apron or conveyer E. (Shown in Fig. 1.) This conveyer or apron is mounted on rollers $e$, to which rotation may be imparted in any desired way, so as to cause the conveyer to travel from the left to the right, according to the construction illustrated in the drawings, so as to carry the flax forward into the mechanism arranged for its further manipulation. The wisps of straw falling on the traveling apron are carried forward as they fall, so that each succeeding wisp as it falls partly overlaps the preceding wisp, which has been moved forward by the traveling conveyer. This overlapping of the wisps as they fall serves to make the stream of straw more continuous and homogeneous, as it were. As the stream of straw passes from the traveling apron or conveyer it is caught between corrugated rollers F and F'. The roller F is provided with beveled rings $f$, and the roller F' is provided with plain rings $f'$, as will be readily understood from an inspection of Fig. 3. These rollers are arranged so that their rings are almost contiguous, though I prefer that they should not touch each other. It is intended that the upper roller F should have an endwise reciprocating movement imparted to it, so that as the flax-straw passes from the traveling conveyer into and between the rollers it will be subjected to a rubbing action by the endwise reciprocating movement of the upper roller. This endwise movement may be imparted in any desired way. In Fig. 5 I have shown a convenient way of securing it. In this arrangement I mount a sleeve $f^2$ on the end of the shaft on which the roller F is mounted and rotates. This sleeve is loose on the shaft, so that the shaft can rotate in it. It is held in place by collars $f^3$, arranged on the shaft at each end of the sleeve. The sleeve is provided with pins $f^4$, one on each side, which pins are received in the forks of a pivoted lever $F^2$, fulcrumed on a fixed point at $F^3$ and pivoted to a link $F^4$, whose outer end is pivoted to a crank-wheel $F^5$, mounted on and rotated by a shaft $f^5$, rotated in any convenient or desired way. As the shaft $f^5$ is rotated the crank-wheel is rotated with it, and the link $F^4$ is given an endwise reciprocating movement, which causes the forked lever $F^2$ to be oscillated on its pivot or fulcrum, so that as its upper end is moved back and forth it imparts an endwise reciprocating movement to the roller F, thus causing the flax-straw between the rollers to be subjected to a rubbing action while passing through between them. This rubbing action serves to loosen the woody substance from the fiber to a certain extent and causes the spreading and flattening of the stream of straw, so that it will be prepared for the succeeding manipulation and treatment. Immediately following the rollers F and F' are sets of longitudinally-corrugated rollers G and G'. The longitudinal corrugations in these rollers are arranged intermeshed with each other, so that as the straw passes between them its woody substance is broken into short lengths and a portion sifted out in the form of fine particles or shives, which fall onto the floor beneath the rollers. From the rollers G and G' the broken straw passes through other sets of similar rollers H and H', except that their longitudinal corrugations are finer or less coarse than those of the first sets of rollers through which the straw passes. In passing through these rollers a still finer breaking of the woody portion of the straw takes place and a still greater quantity of the fine or broken particles are discharged beneath the rollers in the form of shives.

From the rollers H and H' the stream of broken flax is received on a traveling conveyer I, mounted on rollers $i$, to which rotation is imparted in any desired way, so that the conveyer will travel from the left to the right and carry the stream of straw into rollers J and J', provided with longitudinal corrugations still finer or smaller than those in the rollers H and H', by which the woody portion of the straw is further broken, reduced, and discharged, as illustrated in the drawings. From the rollers J and J' the straw passes between rollers K and K'. (Shown in elevation in Fig. 4.) These rollers have fine rings, corrugations, or threads $k$ on them; but, like the rollers F and F', they are intended to be out of engagement with each other, and the roller K is also intended to have a reciprocating endwise movement imparted to it, as has the roller F and by similar means. The means by which I give the roller K a reciprocating endwise movement are simply a duplication of the means illustrated and described for imparting a similar movement to the roller F. This subjects the straw to a fine rubbing action, which serves to still further spread and flatten it and separate the fiber from the remaining adhering particles of woody matter. As the stream of straw, now practically reduced to a stream of fiber, passes from the rollers K and K' it again enters a pair of longitudinally-corrugated rollers L and L', having small or fine corrugations. In its passage through this last set of rollers the fiber is rendered substantially clean or free from woody matter, so that it is in a condition for further treatment and manipulation as fiber freed or separated from its woody substance or matter.

The various sets of rollers above described may have rotation imparted to them in any desired way; but as the particular means for rotating the rollers forms no part of my invention and as it is a matter that any mechanic will understand I do not deem it necessary to illustrate or describe it. I will simply say, however, that I prefer that the sets of rollers J and J', K and K', and L and L' shall have a slightly greater speed of rotation imparted to them than the first sets of rollers through which the straw passes, so as to in a measure draw and straighten the fiber as it passes from the final set of rollers through which it is intended to be passed. As the stream of fiber passes from the rollers L and L' it is in the condition that is termed "sliver" and is converged or guided into a narrow stream and through rollers $l$ and $l'$, passing out into a can or tub M, which is intended to be rotated in any desired way, so that as the sliver falls into it it will have a sufficient twist imparted to it to cause its particles to adhere to each other and prevent it from being too easily or readily broken or separated. I have illustrated as a means for rotating the cans or tubs M a pulley-wheel $m$, arranged beneath it, from which a driving-cord $m'$ is carried around a pulley $m^2$, so as to impart the desired rotation to the can or tub.

As the tubs are filled with the coils of sliver they are taken to a drawing frame or machine and drawn therethrough, as I will now explain, in their further treatment. I will here say that they may be drawn by the drawing-frame out of the tubs or cans M or the piles of sliver emptied from them onto the floor and drawn through the drawing machine or frame, as may be preferred. In Fig. 6 I have shown four of the cans M in position beside the drawing-frame with the sliver being drawn from them to pass over a table or support N', having guides $n'$ for directing the travel of the sliver. The ends of the sliver are inserted between rollers N and $n$, so as to be carried over the roller N and between it and under the rollers $n$. As the stream of sliver leaves the last of the rollers $n$ it is caught in the teeth or pins $o$ of a traveling conveyer O, which extend up through the stream of sliver and draw it forward, the conveyer running between guideways P, by which it is given a straight-line travel. As the sliver leaves the conveyer O it is caught between two rollers Q and $q$ and drawn forward off of the conveyer. From these rollers it passes through corrugated rollers R and $r$ over a table or support R', having converging side guides $r'$ to direct the sliver so as to enter and pass through plain rollers S and $s$, which converge the flattened stream of sliver into a narrow stream, which passes into a stationary or non-rotating can T. This is the first operation to which I subject the sliver after bringing it from the breaking-machine, from which it has been delivered into the revolving tubs M. In this operation the sliver is treated dry, so that any remaining adhering particles of woody matter will be separated and sifted out and the sliver given a more continuous and homogeneous character. After this first treatment or operation in the drawing-frame the sliver is again passed through the drawing-frame a second time. In this second operation the tubs or cans M are removed and the cans T substituted in their place, so that the sliver can be drawn directly out of them without rehandling. In this operation the sliver is drawn or passed through the machine as already described with reference to the first operation, except that in this operation an oil, as petroleum, preferably containing a small percentage—say about two per cent.—of pine or coal tar or other liquid composition, is applied to the sliver. The oil is preferably of a character or made of a character in its composition to act as a preservative of the fiber, although it may be a plain oil without such qualities. Hereinafter in speaking of the oil in the specification and claims I mean to be understood as indicating and including either a plain oil or an oil, liquid, or composition containing preservative properties. The oil may be placed in a tank U, from which a pipe $u$ leads to near the stream of sliver back of the rollers S and $s$, so as to apply the oil to the sliver just before it enters the rollers. The supply of oil through the pipe $u$ may be controlled by a cock $u'$, so that a smaller or greater quantity may be admitted, as desired. After the sliver has been put through the second operation, as above explained, in which an oil is applied to it, it is again passed or drawn through the drawing-frame or machine precisely as in the second operation, except that in this third operation instead of an oil a desired quantity of water is applied to the sliver. This water may be applied in the same way as the oil. Indeed, in practice I simply substitute a water-tank for the oil-tank, making no further change. The water applied during this third operation imparts moisture to the sliver, and as the cans T are filled with it I close them and set them aside overnight, or perhaps for twenty-four hours, so that the moisture will become uniformly diffused through the entire mass of sliver contained in the cans, so that all of the sliver will be moist, soft, and flexible for further treatment and manipulation. After the sliver in the cans has become sufficiently uniformly moistened and softened I again for the fourth time pass it through the drawing frame or machine, as already explained in reference to the first three operations in such machine, except that I apply neither oil nor water to it, but run it through in its moist condition induced and secured as already explained. However, if desired, it may be run through an additional time, although in practice I have found that these four operations in the drawing-frame are usually sufficient to bring the sliver into the desired condition for spinning. I desire also to say that when I speak in the specification and claims of a drawing frame or machine I do not mean to limit myself to any special kind of drawing-frame, but intend to include and cover any suitable mechanism for drawing out, flattening, straightening, smoothing, and arranging the fibers preparatory to their spinning into twine or cord. After the sliver has been subjected to the several operations in the drawing-frame above explained, during which it has had a desired quantity of oil applied to it and a desired quantity of water applied to it and been reduced to the desired condition of moisture, softness, and flexibility and been brought to a sufficiently smooth and homogeneous condition, it is then spun by the usual spinning-jennies into twine of the desired size, coarseness, or strength as may be desired for the purpose to which it is to be applied. As the spinning of the fiber after it is taken to the spinning-jennies differs in no respect from the spinning of fiber secured from retted or rotted flax, I do not deem it necessary to follow its treatment or operation further.

While I have described the mechanical means which I use in carrying out my process or method, I desire to say that I do not mean to limit myself to precise forms, means, or arrangements so long as the general mode of operation and process described are embodied and carried out.

What I regard as new, and desire to secure by Letters Patent, is—

1. The method of preparing flax fiber for spinning, which consists in separating and feeding the flax-straw endwise in bunches or wisps, subjecting the bunches or wisps to an initial or preparatory coarse rubbing crosswise of the straw and feed thereby spreading the straw and loosening the fiber, and then subjecting the material to a continued crushing and transverse breaking of the straw thereby breaking the woody center and separating the same from the fiber for the production of flax-sliver, substantially as described.

2. The method of preparing flax fiber for spinning, which consists in separating and feeding the flax-straw endwise in bunches or wisps, subjecting the bunches or wisps to an initial or preparatory coarse rubbing crosswise of the straw and feed thereby spreading the straw and loosening the fiber, then subjecting the material to a continued crushing and transverse breaking of the straw thereby breaking the woody center and separating the same from the fiber and then subjecting the material to a final or finishing pressing and spreading for the production of flax-sliver, substantially as described.

3. The method of preparing flax fiber for spinning, which consists in separating and feeding the flax-straw endwise in bunches or wisps, subjecting the bunches or wisps to an initial or preparatory coarse rubbing crosswise of the straw and feed thereby spreading the straw and loosening the fiber, then subjecting the material to a continued crushing and transverse breaking of the straw thereby breaking the woody center and separating the same from the fiber, then subjecting the material to a fine rubbing and rolling crosswise of the straw and feed and then subjecting the material to a final or finishing pressing and spreading for the production of flax-sliver, substantially as described.

4. The method of preparing flax fiber for spinning, which consists in subjecting unretted flax-straw endwise fed in bunches or wisps to an initial or preparatory coarse rubbing crosswise of the straw and feed thereby spreading the straw and loosening the fiber, then subjecting the material to a continued crushing and crosswise breaking of the straw longitudinally thereby breaking the woody portion and separating the same from the fiber, then subjecting the material to a final or finishing pressing and spreading and then subjecting the sliver so produced to repeated drawings and treating the sliver during the drawings with oil, substantially as described.

5. The method of preparing flax fiber for spinning which consists in subjecting unretted flax-straw endwise fed in bunches or wisps to an initial or preparatory coarse rubbing crosswise of the straw and feed thereby spreading the straw and loosening the fiber, then subjecting the material to a continued crushing and crosswise breaking of the straw thereby breaking the woody portion and separating the same from the fiber, then subjecting the material to a final or finishing pressing and spreading, then subjecting the sliver so produced to repeated drawings, treating the sliver during the drawings with oil and applying water to the sliver after oiling and during the drawings, substantially as described.

6. The method of preparing flax fiber for spinning, which consists in subjecting unretted flax-straw to rubbing, crushing, breaking and pressing, for separating the woody substance from the fiber and forming the fiber into sliver, then subjecting the sliver to repeated drawings, treating the sliver during the drawings with oil, applying water to the sliver after oiling and during the drawings, and storing the sliver, after treatment with the oil and water, a sufficient length of time to cause the moisture to become uniformly diffused through it, rendering it soft and flexible, substantially as described.

7. The method of preparing flax fiber for spinning, which consists in subjecting unretted flax-straw to rubbing, crushing, breaking and pressing, for separating the woody substance from the fiber and forming the fiber into sliver, then subjecting the sliver to repeated drawings, treating the sliver during the drawings with oil, applying water to the sliver after oiling and during the drawings, storing the sliver, after treatment with the oil and water, a sufficient length of time to cause the moisture to become uniformly diffused through it, rendering it soft and flexible, and then subjecting the moistened and softened sliver to a drawing treatment, substantially as described.

8. The method of preparing flax fiber for spinning which consists in forming the fiber into sliver, subjecting the sliver to a preparatory drawing, then subjecting the sliver to a second drawing and during the second drawing treating the sliver with oil and then subjecting the sliver after treatment with oil to a third drawing and applying water to the sliver during the third drawing, substantially as described.

GEORGE H. ELLIS.

Witnesses:
THOMAS A. BANNING,
SAMUEL W. BANNING.